(No Model.)
L. SCHMETZER.
CARRIAGE TOP.
No. 272,779. Patented Feb. 20, 1883.
Fig. 1.
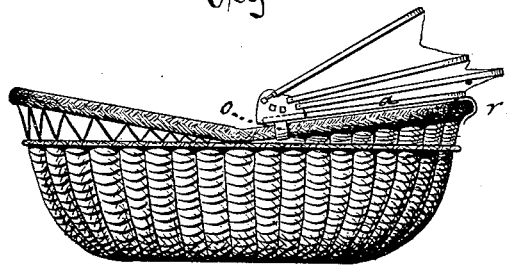
Fig. 2.
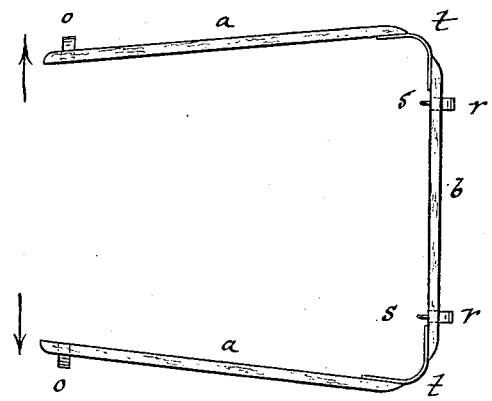
Fig. 3.
Fig. 4.
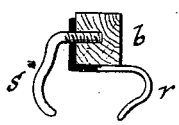
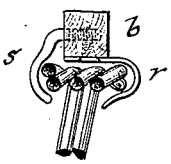
Fig. 5.
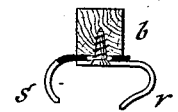
WITNESSES:
Jos. M. Rosenbaum
Otto Risch
Fig. 6.
INVENTOR
Louis Schmetzer
BY Paul Goepel
ATTORNEY
N. PETERS, Photo-Lithographer, Washington, D. C.

UNITED STATES PATENT OFFICE.

LOUIS SCHMETZER, OF ROTHENBURG-ON-THE-TAUBER, BAVARIA, GERMANY.

CARRIAGE-TOP.

SPECIFICATION forming part of Letters Patent No. 272,779, dated February 20, 1883.

Application filed December 20, 1882. (No model.)

*To all whom it may concern:*

Be it known that I, LOUIS SCHMETZER, a subject of the King of Bavaria, and a resident of the city of Rothenburg-on-the-Tauber, in the Kingdom of Bavaria, German Empire, have invented certain new and useful Improvements in Carriage-Tops, of which the following is a specification.

This invention relates to an improvement in the carriage-tops for which application for Letters Patent of the United States have been filed by me heretofore, under date of July 25, 1882, Serial No. 67,654, the improvement having for its object to do away with the hook-shaped fastening devices applied to the rim of the carriage-body for securing the top, and to prevent any accidental injury to children or grown persons; and the invention consists in arranging the hook-shaped fastening devices on the lower stay of the carriage-top, said stay being made of side strips and a transverse rear strip, connected by bent spring corner-pieces, of which the former have end hooks, the latter fixed outer and adjustable inner hooks.

In the accompanying drawings, Figure 1 represents a side view of a carriage-top with my improved top. Fig. 2 is a top view of the lowermost stay, with its fastening-hooks. Figs. 3, 4, and 5 show the fastening-hooks on an enlarged scale; and Fig. 6 is an end view of the lowermost stay, shown as connected to the carriage-body.

Similar letters of reference indicate corresponding parts.

The stays of the carriage-top are made of side strips, $a\,a$, and a transverse top strip, $b$, which are connected by bent spring corner-pieces $t\,t$. Outwardly-extending hooks $o\,o$ are attached to the outer ends of the side strips, $a\,a$, of the lowermost stay. The hooks $o\,o$ engage the rim of the carriage-body from the outside. The transverse connecting-strip $b$ is provided with hooks $r$ and $s$. The hook $r$, which is firmly fastened to the strip $b$, engages the rim of the carriage-body from the outside, while the semicircularly-bent hook $s$ is adjustable and engages the rim of the body from the inside. The hook $s$ is either screwed into the top strip, $b$, as shown in Figs. 3 and 4, or it may be slotted and fastened to the under side of the strip by the same screw by which the hook $r$ is applied, as shown in Fig. 5. When removing the top of the carriage the side strips of the lowermost stays, $a\,a$, are bent outwardly away from the carriage-body, as indicated by the arrows in Fig. 2, and then raised. The strip $b$ may then be removed from the rim of the carriage-body. The inner hook, $s$, is adjusted to the width of the rim of the carriage-body.

It is obvious that the hooks $o\,o$ may also be applied to the rim from the inside, and that the outer hooks, $r$, may be made adjustable, while the inner hooks, $s$, are fixed as desired.

Having thus described my invention, I claim as new and desire to secure by Letters Patent—

The combination, in a carriage-top, of the lower stay, composed of side strips, $a\,a$, a transverse rear strip, $b$, and connecting spring corner-pieces $t\,t$, with hooks $o\,o$, attached to the outer ends of the side strips, and with outer and inner hooks, $r\,s$, attached to the rear strips, substantially as and for the purpose described.

In testimony whereof I have signed my name to this specification in the presence of two subscribing witnesses.

LOUIS SCHMETZER.

Witnesses:
E. EANER,
M. VETTER.